United States Patent [19]

Petersen

[11] 4,080,184
[45] Mar. 21, 1978

[54] ENGINE AIR INTAKE SYSTEM

[76] Inventor: Ross K. Petersen, 2974 W. River Rd., Minneapolis, Minn. 55406

[21] Appl. No.: 711,832

[22] Filed: Aug. 5, 1976

Related U.S. Application Data

[62] Division of Ser. No. 571,584, May 25, 1975, Pat. No. 4,013,137.

[51] Int. Cl.$^2$ .............................................. B01D 50/00
[52] U.S. Cl. ................................. 55/315; 55/385 B; 180/54 A; 138/106; 137/351
[58] Field of Search ............ 55/385 B, 342, DIG. 28, 55/315, 385 F; 180/54 A, 69 R, 69 C, 69.01, 69.1; 285/42, 43, 177, 192, 193, 194, 415; 138/106, 107; 137/351

[56] References Cited

U.S. PATENT DOCUMENTS

| | | | |
|---|---|---|---|
| 1,102,046 | 6/1914 | Hanson | 285/192 |
| 1,276,321 | 8/1918 | Bropson | 285/42 |
| 1,299,423 | 4/1919 | Bropson | 285/42 |
| 1,888,260 | 11/1932 | Clark | 285/415 |
| 2,081,021 | 5/1937 | Smith et al. | 285/415 |
| 2,406,852 | 9/1946 | Relf | 285/192 |
| 2,449,229 | 9/1948 | Hopwood | 285/192 |
| 2,679,911 | 6/1954 | Bhend | 285/177 |
| 3,207,250 | 9/1965 | Bamford | 55/DIG. 28 |
| 3,737,002 | 6/1973 | Yotsomoto | 55/385 B |

FOREIGN PATENT DOCUMENTS

2,025,161   3/1970   Germany ............................ 285/192

*Primary Examiner*—Frank W. Lutter
*Assistant Examiner*—David L. Lacey
*Attorney, Agent, or Firm*—Burd, Braddock & Bartz

[57] ABSTRACT

An intake air system for an internal combustion engine having an upright stack mounted on vehicle structure, as a hood, with a stack connecting assembly. An air precleaner is mounted on the upper end of the stack. The lower end of the stack is connected to tubular members which leads to the air cleaner of the engine. The mount structure for the stack has an adjustable clamp using a split ring to selectively hold the stack in a predetermined position on the vehicle.

5 Claims, 4 Drawing Figures

U.S. Patent     March 21, 1978     4,080,184
FIG. 1
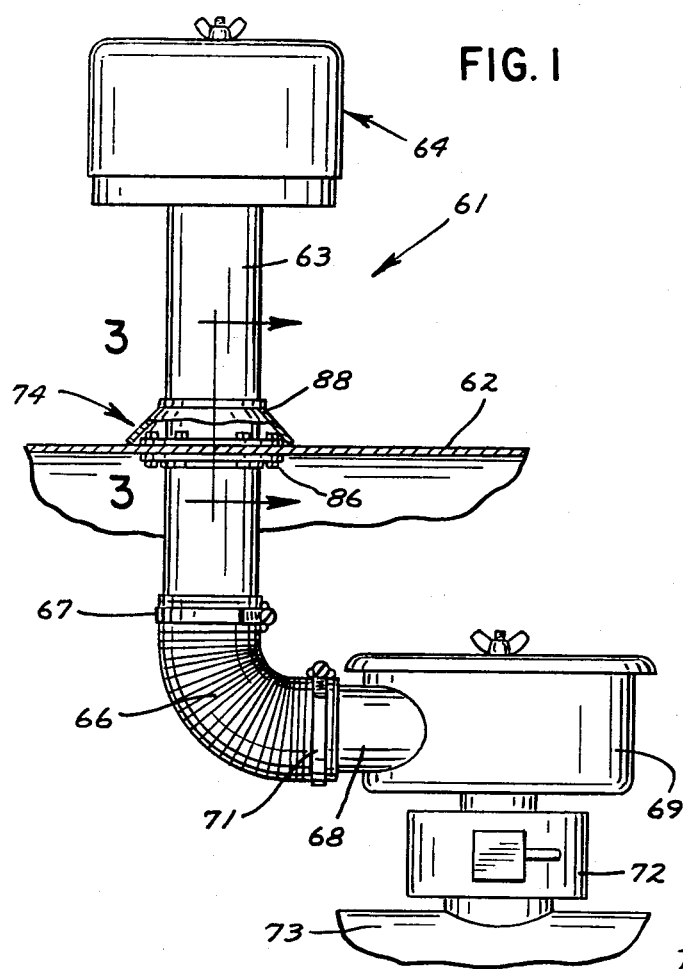
FIG. 2
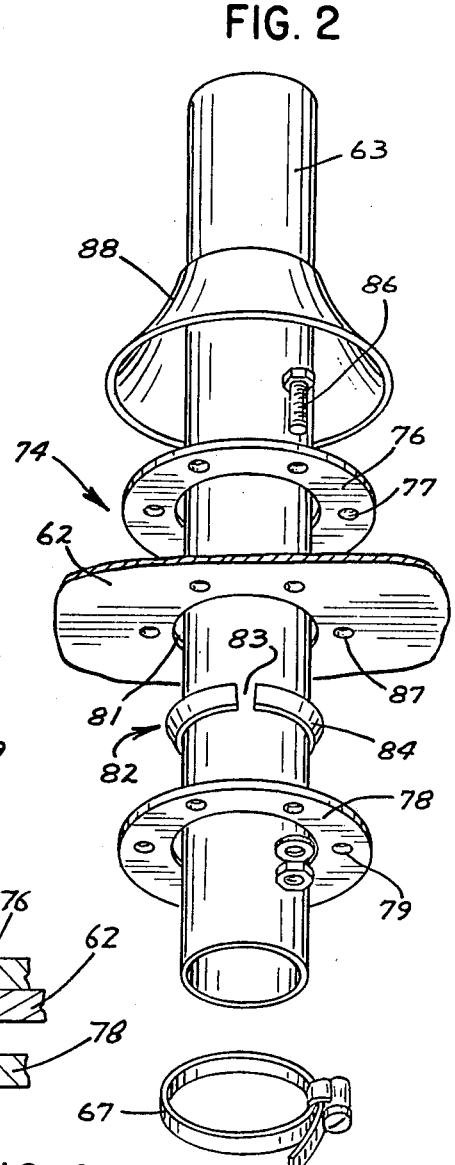
FIG. 4
FIG. 3
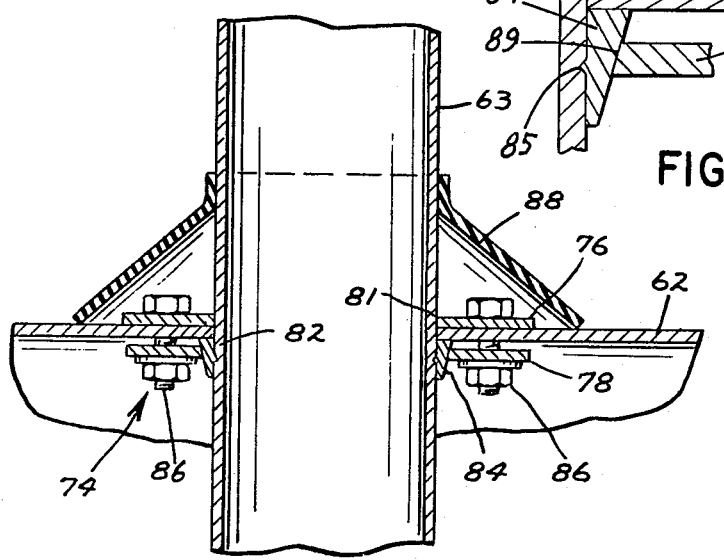
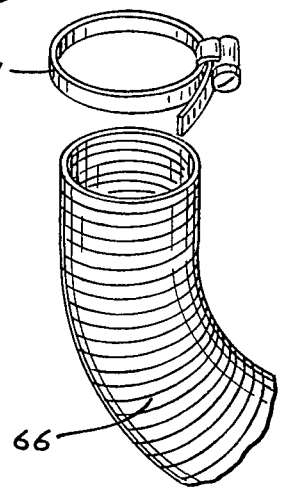

ENGINE AIR INTAKE SYSTEM

This application is a division of U.S. application Ser. No. 571,584 filed Apr. 25, 1975, now U.S. Pat. No. 4,013,137.

BACKGROUND OF THE INVENTION

Prior to the introduction of air into an internal combustion engine, it is desirable to remove from the air, so far as possible, entrained particulate matter such as dirt, dust, sand, snow, and the like. Air cleaners and precleaners in general use for such purpose promote more efficient combustion and longer engine life.

Air cleaners are normally mounted on or adjacent the carburetors of internal combustion engines. This locates the air cleaners under the hoods or cover structures for the engine. Air intake pipes or stacks are used to carry outside air to the air cleaners. Air precleaners located outside of the hoods are mounted on the stacks to provide for the flow of relatively clean air into the stacks. The air cleaners function to further clean the air before it flows into the engine. Air precleaners which have been devised utilize centrifugal force of air circulating within a chamber to separate clean air from air entrained with particulate matter for introduction of the clean air into the carburetor inlet. For example, see U.S. Pat. No. 3,670,480. Stationary deflection blades disposed in an inlet to the chamber impart circular motion to the air flowing through the chamber to centrifugally separate air entrained with particulate matter from clean air. An impeller assembly is used to push the air entrained with particulate matter out of a discharge from the chamber. Such devices, however, do not take full advantage of air movement produced at the carburetor inlet to power the impeller.

SUMMARY OF THE INVENTION

The invention relates to an air intake system for use with an apparatus or machine that requires a supply of relatively clean air. More particularly, the invention is directed to an air intake system for an internal combustion engine. The system has an air intake pipe or stack mounted on vehicle structure with a connecting assembly. The inside end of the stack projects through the vehicle structure and is connected to tubular means leading to and connected to the air cleaner of the engine. The connecting assembly has releasable clamp means which allows the position of the stack to be adjusted on the vehicle structure. An air precleaner mounted on the outside end of the stack functions to separate particulate matter as dirt, dust, sand, snow and the like from air moving through the precleaners.

OBJECTS OF THE INVENTION

An object of the invention is to provide an air intake system for an internal combustion engine that can be mounted on vehicle structure and supports an air precleaner. A further object of the invention is to provide structure for mounting an air intake stack on the hood of a vehicle. Another object of the invention is to provide adjustable clamp structure for mounting an air intake stack at a selected position on the hood of a vehicle. Yet another object of the invention is to provide a stack mounting assembly for connecting an air intake stack to a support that is sturdy in construction, reliable and safe in use, and economical to manufacture.

FIG. 1 is an elevational view of the air intake system of the invention;

FIG. 2 is an exploded perspective view of the air intake system of FIG. 1;

FIG. 3 is an enlarged sectional view taken along line 3—3 of FIG. 1; and

FIG. 4 is an enlarged sectional view of a part of the stack mounting assembly of FIG. 3.

DESCRIPTION OF PREFERRED EMBODIMENT

Referring to FIGS. 1 to 3, there is shown an air cleaning system indicated generally at 61. The air cleaning system is mounted on the generally horizontal hood 62 of a vehicle having an internal combustion engine. System 61 has a generally upright air pipe or stack 63. An air precleaner 64 is mounted on top of pipe 63. The lower end of pipe 63 extends below hood 62 and is connected to an elbow 66. Elbow 66 is a flexible tubular member which can vary in length according to the distance between the lower end of pipe 63 and air cleaner 69. A first band clamp 67 attaches elbow 66 to the lower end of pipe 63. The opposite end of elbow 66 is mounted on an air inlet member or pipe 68 of the air cleaner 69. A band clamp 71 secures elbow 66 to pipe 68. The air cleaner 69 is mounted on top of a carburetor 72 of an internal combustion engine 73. The air cleaner 69 can be mounted on an air intake structure of a diesel engine.

A connecting assembly indicated generally at 74 secures the pipe 63 to hood 62. The connecting assembly 74 is operable to permit vertical adjustment of pipe 63 so that the air cleaning system can be used with a variety of vehicles without altering the parts of the air cleaning system or adding parts to the system. The connecting assembly 74 has a top or first plate 76 located above the hood 62. Plate 76 is a circular member having a plurality of circumferentially spaced holes 77. A second plate 78 is located below the hood 62. Plate 78 is an annular ring member having a plurality of circumferentially spaced holes 79. Each plate 76 and 78 has a central opening or passage larger than the outside diameter of the pipe 63 so that the pipe can move freely relative to plates 76 and 78. A split ring indicated generally at 82 surrounds pipe 63 and is located between plates 76 and 78 below the hood 62. Ring 82 has a split or space 83 which permits the ring to be contracted or compressed on pipe 63. As shown in FIGS. 3 and 4, the ring 82 has an upwardly tapered outside surface 84 and an inside circumferential rib 85 located in gripping engagement with the outside surface of pipe 63.

As shown in FIG. 3, a plurality of fasteners, as nut and bolt assemblies 86, extend through holes 77 and 79 in plates 76 and 78, respectively, and aligned holes 87 in hood 62 to clamp the plates 76 and 78 on hood 62.

As shown in FIG. 3, the second plate 78 has an annular inside tapered wall or edge 89 in engagement with the tapered outside surface 84 of the split ring 82. When the fasteners 86 are tightened, the plate 78 rides up on the inclined or tapered surface 84 and compresses or clamps the ring 82 on the pipe 63. The ring 82, having a split or opening 83, will contract and move the inside rib 85 into tight gripping or clamping engagement with the pipe 63. The upper end of ring 82 bears against the inside or lower surface of hood 62 so that the ring 82 is in firm and tight holding engagement with the pipe 63. Pipe 63 can be vertically adjusted relative to hood 62 and clamped in a number of vertical positions, required by the location of the air cleaner 69 and structure of the internal combustion engine.

A generally inverted cone-shaped hood or cover 88 is positioned about pipe 63 and covers the top of nut and bolt assemblies 86 and plate 76. The cover 88 can be made of rubber, plastic or other suitable flexible material.

The air precleaner 64 can be constructed in accordance with the precleaner of U.S. Pat. No. 3,670,480.

While there has been shown and described a specific embodiment of the invention, it will be apparent to those skilled in the art that certain deviations may be had from that embodiment shown without departing from the scope and spirit of the appended claims.

The embodiments of the invention in which an exclusive property or privilege is claimed are defined as follows:

1. An air carrying structure for use with a vehicle having a hood with an opening and an internal combustion engine having an air intake manifold comprising:
   a generally upright tubular stack extended through the opening in the hood, said stack having an upper end above the hood and a lower end below the hood,
   means operatively connecting the lower end of the stack to the air intake manifold,
   mount means securing the stack to the hood, said mount means including:
   a first annular plate located above the hood and freely disposed around the stack,
   a second annular plate having an inside wall located below the hood and freely disposed around the stack,
   a split ring having a tapered outside surface engaged with the inside wall of said second annular plate and extending partially therethrough and having an inside surface engaged with the stack, said split ring being located below the hood, and
   fastening means connecting said first plate to said second plate and connecting the plates to the hood, said fastening means securing said first plate in axial abutting engagement with the hood thereabove and said split ring in axial abutting engagement with the hood therebelow by engagement with said second annular plate and the inside wall of said second annular plate clamps the split ring onto the stack while said first plate is clamped to said hood by said fastening means.

2. The structure of claim 1 including: cover means surrounding the stack and located over the first annular plate.

3. The structure of claim 1 wherein: the means connecting the lower end of the stack to the air intake manifold includes an air cleaner and at least one flexible tubular member connecting the air cleaner to the lower end of the stack.

4. The structure of claim 3 including: an air precleaner mounted on the upper end of the stack operable to separate particulate matter from the air and direct clean air into the stack.

5. The structure of claim 1 wherein said split ring includes an inwardly directed rib on said inside surface thereof to enhance frictional gripping engagement with said stack.

* * * * *